US010069558B2

(12) United States Patent
Scott

(10) Patent No.: US 10,069,558 B2
(45) Date of Patent: Sep. 4, 2018

(54) REDUCING CALL SETUP DELAY IN GEOMOBILE SATELLITE NETWORKS

(71) Applicant: THE BOEING COMPANY, Chicago, IL (US)

(72) Inventor: James P. Scott, Chicago, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/749,401

(22) Filed: Jun. 24, 2015

(65) Prior Publication Data
US 2016/0380693 A1 Dec. 29, 2016

(51) Int. Cl.
H04W 4/00 (2018.01)
H04B 7/185 (2006.01)
H04W 84/06 (2009.01)
H04W 28/18 (2009.01)
H04L 29/06 (2006.01)
H04W 88/18 (2009.01)

(52) U.S. Cl.
CPC ..... H04B 7/18558 (2013.01); H04B 7/18513 (2013.01); H04B 7/18571 (2013.01); H04L 65/1006 (2013.01); H04L 65/1033 (2013.01); H04W 28/18 (2013.01); H04W 84/06 (2013.01); H04W 88/181 (2013.01)

(58) Field of Classification Search
CPC ............ H04B 7/18558; H04B 7/18513; H04B 7/18571; H04L 65/1006; H04L 65/1033; H04L 65/1069; H04W 84/06; H04W 28/18; H04W 88/181
See application file for complete search history.

(56) References Cited

U.S. PATENT DOCUMENTS

2002/0098802 A1* 7/2002 Karabinis .......... H04B 7/18563
455/13.1
2008/0274739 A1* 11/2008 Wu ..................... H04L 65/1073
455/435.1
(Continued)

OTHER PUBLICATIONS

Border, et al., Performance Enhancing Proxies Intended to Mitigate Link-Related Degradations, RFC 3135, Jun. 2001.
(Continued)

Primary Examiner — Barry W Taylor
(74) Attorney, Agent, or Firm — Haynes and Boone, LLP

(57) ABSTRACT

In some embodiments, a disclosed method involves receiving, by a source gateway, a call request from a source user terminal for establishing a call with a destination user terminal. The method further involves determining, by a source client proxy of the source gateway, a capability related to a parameter(s) of the source user terminal and a capability related to a parameter(s) of the destination user terminal. Also, the method involves sending, by the source client proxy, a call capability offer to a destination gateway based on the determined capabilities. Additionally, the method involves determining, by a destination client proxy of the destination gateway, whether the destination user terminal can support the call capability offer. Also, the method involves sending, by the destination client proxy, a call initiation message to the destination user terminal, when the destination client proxy determines that the destination user terminal can support the call capability offer.

28 Claims, 9 Drawing Sheets

(56) References Cited

U.S. PATENT DOCUMENTS

| | | | | |
|---|---|---|---|---|
| 2010/0195564 A1* | 8/2010 | Jong | ........... | H04B 7/18513 370/326 |
| 2010/0211686 A1* | 8/2010 | Poikselka | ........... | H04L 65/1069 709/227 |
| 2010/0318670 A1* | 12/2010 | Al-Shalash | ........... | H04W 76/02 709/229 |
| 2011/0136483 A1* | 6/2011 | Dwight | ........... | H04W 28/18 455/422.1 |
| 2013/0265878 A1* | 10/2013 | Veenstra | ........... | H04L 29/06 370/235 |
| 2015/0312838 A1* | 10/2015 | Torres | ........... | H04B 7/18582 370/329 |
| 2016/0021163 A1* | 1/2016 | Lee | ........... | H04L 65/605 370/352 |
| 2016/0072868 A1* | 3/2016 | Poulin | ........... | H04L 65/605 709/219 |
| 2016/0226923 A1* | 8/2016 | Purkop | ........... | H04L 65/1016 |
| 2017/0006134 A1* | 1/2017 | Siegel | ........... | H04L 65/1006 |

OTHER PUBLICATIONS

Rosenberg, et al, SIP: Session Initiation Protocol, RFC 3261, Jun. 2002.

Rosenberg & Schulzrinne, An Offer/Answer Model with the Session Description Protocol (SDP), RFC 3264, Jun. 2002.

Handley, et al., SDP: Session Description Protocol, RFC 4566, Jul. 2006.

\* cited by examiner

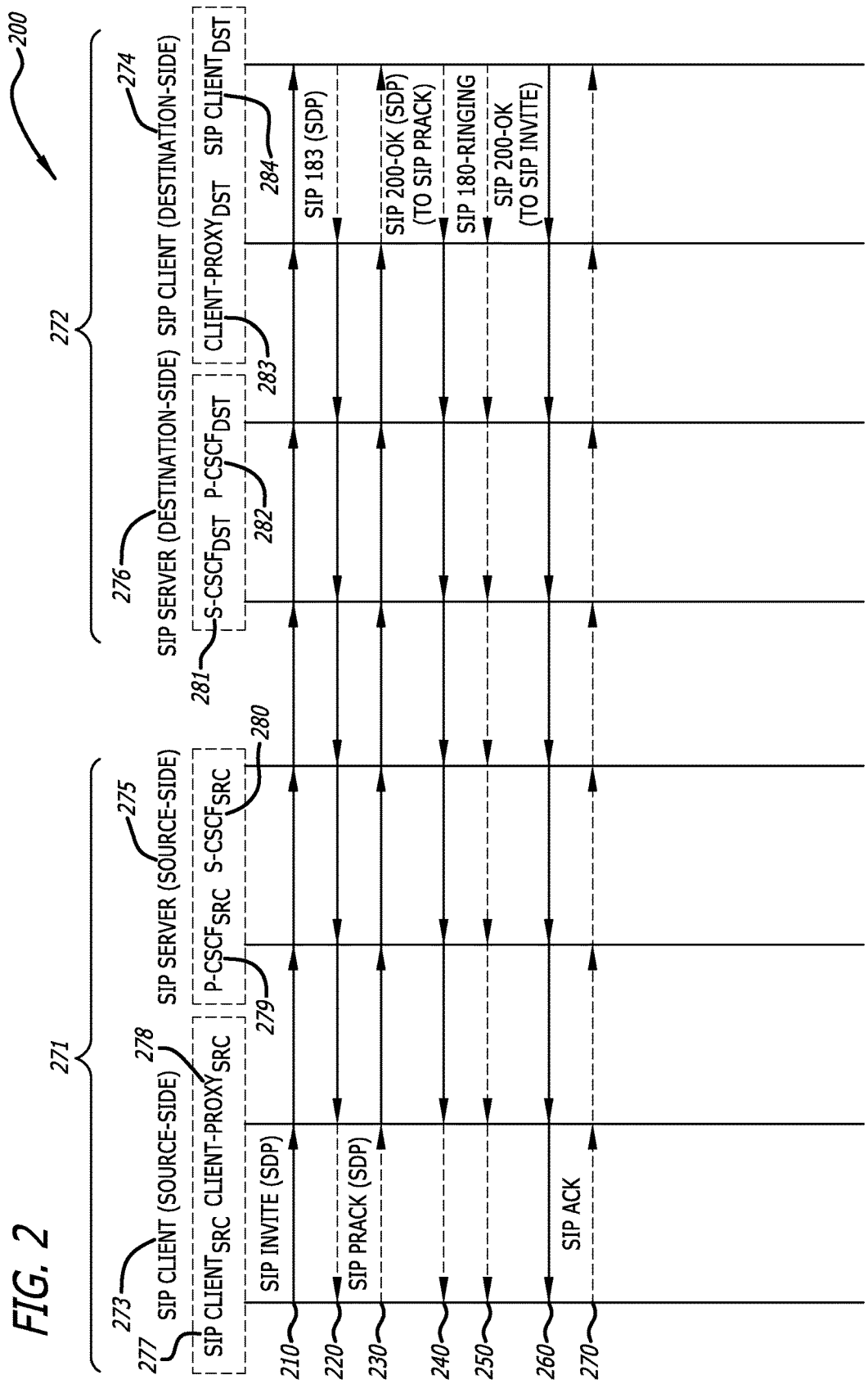

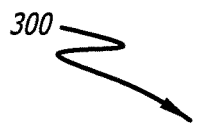

$$\delta_{SETUP} = \sum_{k=1}^{n}\left(\sum_{j=1}^{k}\delta_{PROP} + \left((k_{nj}-1)\delta_{IFG}\right)\right) + (\mu-\lambda)^{-1}$$

$n$ = the number of SIP messages $k$ = the number of PHY frames per SIP message $\delta_{PROP}$ = the one-way (forward or reverse) delay over the satellite link (feeder link + user link)

$\delta_{IFG}$ = the interframe gap delay (between PHY frames)

$\mu$ = the service rate for processing SIP messages (by the network)

$\lambda$ = the arrival rate of SIP messages (at the network)

FIG. 3

REDUCING CALL SETUP DELAY IN GEOMOBILE SATELLITE NETWORKS

FIELD

The present disclosure relates to geomobile satellite networks. In particular, it relates to reducing call setup delay in geomobile satellite networks.

BACKGROUND

Currently, establishing multimedia (e.g., voice and/or data) sessions (e.g., establishing a call connection) in a network typically employs session establishment protocols, such as Session Initiation Protocol/Session Description Protocol (SIP/SDP), that apply an Offer/Answer model to establish end-to-end state resource management and manage resource allocation between a source user terminal (e.g., a satellite phone or a cellular phone) and a destination user terminal (e.g., a satellite phone or a cellular phone). In current practice, using SIP/SDP, for an error-free case, a minimum of seven (7) messages are typically exchanged across the end-to-end network between the source user terminal and the destination user terminal. For satellite networks, the exchange of the messages requires that each of these messages traverse the satellite air interface, which for the geomobile case introduces significant propagation delay. For double-hop geomobile networks (e.g., the message must traverse a satellite source user link 120 to a satellite source feeder link 125, across a terrestrial Packet Data Network (PDN) link 194, to a satellite destination feeder link 175 to a satellite destination user link 195 (refer to FIG. 1), or vise versa), an additional one-half (0.5) second of setup delay will be imposed for each message transmitted due solely to the additional propagation delays associated with the satellite air interface. It should be noted that existing solutions adapt standard protocols and architectures from commercial terrestrial cellular networks, which does not account for any of the component links in the end-to-end network being either long-delay or low-reliability. Users desire shorter call setup times for satellite networks, especially users in emergency situations and users that are first responders, police, and other disaster relief workers. As such, there is a need for an improved technique for reducing the session establishment time for multimedia traffic (e.g., voice and/or data) in satellite networks.

SUMMARY

The present disclosure relates to a method, system, and apparatus for reducing call setup delay in geomobile satellite networks. In one or more embodiments, a method for reducing call setup delay involves receiving, by a source gateway, a call request from a source user terminal. In at least one embodiment, the call request is a request for the source user terminal to establish a call with a destination user terminal. In some embodiments, the source gateway comprises a source client proxy.

The method further involves determining, by the source client proxy, a capability related to at least one parameter of the source user terminal and a capability related to at least one parameter of the destination user terminal. Also, the method involves sending, by the source client proxy, a call capability offer to a destination gateway. In one or more embodiments, the call capability offer is based on the capability related to at least one parameter of the source user terminal and the capability related to at least one parameter of the destination user terminal. In at least one embodiment, the destination gateway comprises a destination client proxy.

In addition, the method involves determining, by the destination client proxy, whether the destination user terminal can support the call capability offer. Additionally, the method involves sending, by the destination client proxy, a call initiation message to the destination user terminal, when the destination client proxy determines that the destination user terminal can support the call capability offer. Further, the method involves sending, by the destination client proxy, a call refusal message to the source client proxy, when the destination client proxy determines that the destination user terminal cannot support the call capability offer (and no transcoding options can resolve the resource conflict).

In one or more embodiments, the method further involves processing, by at least one source server, at least one SIP/SDP message of the call request. In at least one embodiment, the source gateway comprises at least one source server. In some embodiments, the source gateway comprises a source server cluster comprising at least one source server.

In at least one embodiment, the method further involves processing, by at least one destination server, at least one SIP/SDP message of the call capability offer. In one or more embodiments, the destination gateway comprises at least one destination server. In some embodiments, the destination gateway comprises at least one destination server cluster comprising at least one destination server.

In one or more embodiments, the source user terminal is a satellite phone. In at least one embodiment, the source user terminal sends the call request to the source gateway via a satellite source user link and a satellite source feeder link.

In at least one embodiment, the source user terminal is a cellular phone. In some embodiments, the source gateway receives the call request from the source user terminal via at least one source cellular link.

In one or more embodiments, the destination user terminal is a satellite phone. In at least one embodiment, the destination client proxy sends the call initiation message to the destination user terminal via a satellite destination feeder link and a satellite destination user link. In some embodiments, the destination client proxy sends the call refusal message to the source client proxy via a satellite destination feeder link and a satellite source feeder link.

In at least one embodiment, the destination user terminal is a cellular phone. In one or more embodiments, the destination client proxy sends the call initiation message to the destination user terminal via at least one destination cellular link. In some embodiments, the destination client proxy sends the call refusal message to the source client proxy via a satellite destination feeder link and a satellite source feeder link.

In one or more embodiments, the source client proxy determines the capability related to at least one parameter of the source user terminal and the capability related to at least one parameter of the destination user terminal by accessing a source session database.

In at least one embodiment, the destination client proxy determines whether the destination user terminal can support the call capability offer by accessing a destination session database.

In one or more embodiments, the method further involves synchronizing, over a network, a source session database and a destination session database. In at least one embodiment, the source gateway comprises the source session database. In some embodiments, the destination gateway comprises the destination session database. In one or more embodiments, the network is a packet data network (PDN).

In at least one embodiment, the source client proxy provides a Performance Enhancement Proxy (PEP) to enhance Transmission Control Protocol (TCP) traffic. In some embodiments, the destination client proxy provides a Performance Enhancement Proxy (PEP) to enhance Transmission Control Protocol (TCP) traffic.

In one or more embodiments, a system for reducing call setup delay involves a source user terminal to send a call request to a source gateway. In at least one embodiment, the call request is a request to establish a call with a destination user terminal. In some embodiments, the call request comprises at least one Session Initiation Protocol/Session Description Protocol (SIP/SDP) message. In one or more embodiments, the source gateway comprises a source client proxy.

The system further involves the source client proxy to determine a capability related to at least one parameter of the source user terminal and a capability related to at least one parameter of the destination user terminal, and to send a call capability offer to a destination gateway. In one or more embodiments, the call capability offer is based on the capability related to at least one parameter of the source user terminal and the capability related to at least one parameter of the destination user terminal. In at least one embodiment, the call capability offer comprises at least one SIP/SDP message. In some embodiments, the destination gateway comprises a destination client proxy.

Further, the system involves a destination client proxy to determine whether the destination user terminal can support the call capability offer, to send a call initiation message to the destination user terminal when the destination client proxy determines that the destination user terminal can support the call capability offer, and to send an call refusal message to the source client proxy when the destination client proxy determines that the destination user terminal cannot support the call capability offer (and no transcoding options can resolve the resource conflict).

In one or more embodiments, a method for reducing call setup delay involves sending, by a source user terminal, a call request to a gateway. In one or more embodiments, the call request is a request to establish a call with a destination user terminal. In some embodiments, the gateway comprises a client proxy. The method further involves determining, by the client proxy, a capability related to at least one parameter of the source user terminal and a capability related to at least one parameter of the destination user terminal. Also, the method involves generating, by the client proxy, a call capability offer, wherein the call capability offer is based on the capability related to at least one parameter of the source user terminal and the capability related to at least one parameter of the destination user terminal. In addition, the method involves determining, by the client proxy, whether the destination user terminal can support the call capability offer. Additionally, the method involves sending, by the client proxy, a call initiation message to the destination user terminal, when the client proxy determines that the destination user terminal can support the call capability offer. Further, the method involves sending, by the client proxy, a call refusal message to the source user terminal, when the client proxy determines that the destination user terminal cannot support the call capability offer.

In at least one embodiment, a system for reducing call setup delay involves a source user terminal to send a call request to a gateway. In one or more embodiments, the call request is a request to establish a call with a destination user terminal. The system further involves a client proxy, in at least one gateway, to send at least one message to negotiate at least one capability related to at least one parameter of the source user terminal and of the destination user terminal to establish the call between the source user terminal and the destination user terminal.

In one or more embodiments, the client proxy is further capable to adapt the negotiation message flow according to capabilities of the network associated with the source user terminal and capabilities of the network associated with the destination user terminal.

In at least one embodiment, the client proxy is further capable to switch vocoders, thereby allowing for already established calls to change the vocoders dynamically in order to adapt to changing link conditions.

In one or more embodiments, a method for reducing call setup delay involves receiving, by a source gateway, a call request from a source user terminal. In at least one embodiment, the call request is a request to establish a call with a destination user terminal. The method further involves determining, by a source client proxy in the source gateway, a capability related to at least one parameter of the source user terminal and a capability related to at least one parameter of the destination user terminal. Also, the method involves sending, by the source client proxy, a call capability offer to a destination gateway. In some embodiments, the call capability offer is based on the capability related to at least one parameter of the source user terminal and the capability related to at least one parameter of the destination user terminal.

In at least one embodiment, a method for reducing call setup delay involves receiving, by a destination client proxy in a destination gateway, a call capability offer from a source client proxy in a source gateway. In one or more embodiments, the call capability offer is based on a capability related to at least one parameter of a source user terminal, which is requesting a call with a destination user terminal, and a capability related to at least one parameter of the destination user terminal. The method further involves determining, by the destination client proxy, whether the destination user terminal can support the call capability offer. Also, the method involves sending, by the destination client proxy, a call initiation message to the destination user terminal, when the destination client proxy determines that the destination user terminal can support the call capability offer. Further, the method involves sending, by the destination client proxy, a call refusal message to the source client proxy, when the destination client proxy determines that the destination user terminal cannot support the call capability offer.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 1 is a diagram showing the disclosed system for reducing call setup delay in geomobile satellite networks, employing two gateways, where both the source user terminal and the destination user terminal are satellite phones, and where the source side and the destination side are operated by the same entity (e.g., Iridium Satellite Phone Communications), in accordance with at least one embodiment of the present disclosure.

FIG. 2 is a diagram depicting exemplary messages that are sent and received when a source user terminal is establishing a call with a destination user terminal, in accordance with at least one embodiment of the present disclosure.

FIG. 3 shows an equation for calculating the amount of call setup delay ($\delta_{SETUP}$) for SIP-based services in a geomobile satellite network.

Figure 8:
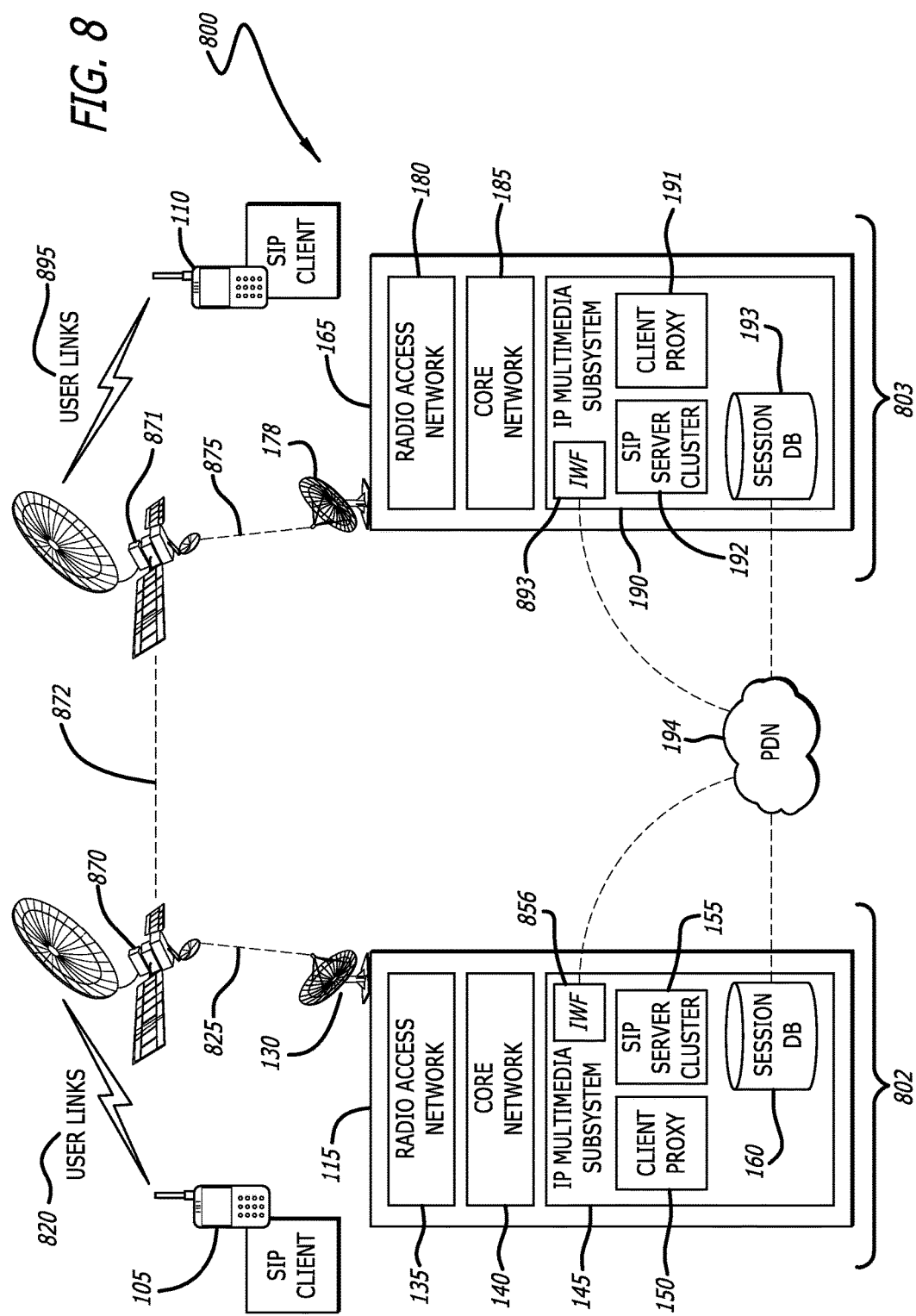

FIG. 8 is a diagram showing the disclosed system for reducing call setup delay in geomobile satellite networks, employing two gateways, where both the source user terminal and the destination user terminal are satellite phones, and where the source side is operated by one entity (e.g., Iridium Satellite Phone Communications) and the destination side is operated by another entity (e.g., Thuraya Satellite Phone Communications), in accordance with at least one embodiment of the present disclosure.

Figure 9:
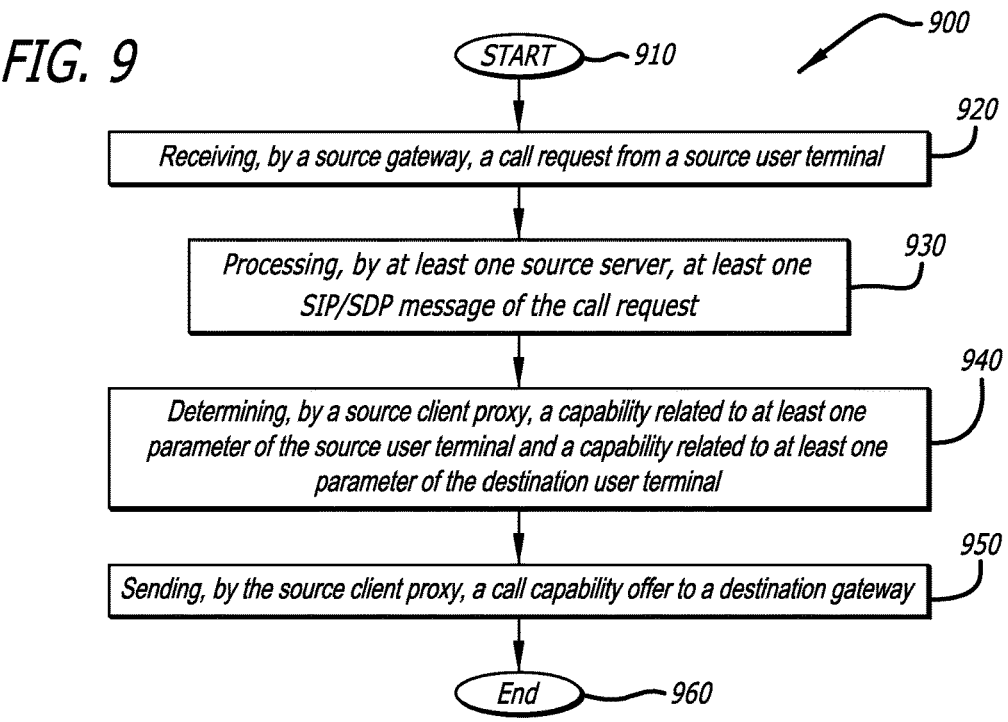

FIG. 9 is a flow chart depicting the disclosed method for reducing call setup delay in geomobile satellite networks for the source side of the system depicted in FIG. 8, in accordance with at least one embodiment of the present disclosure.

Figure 10:
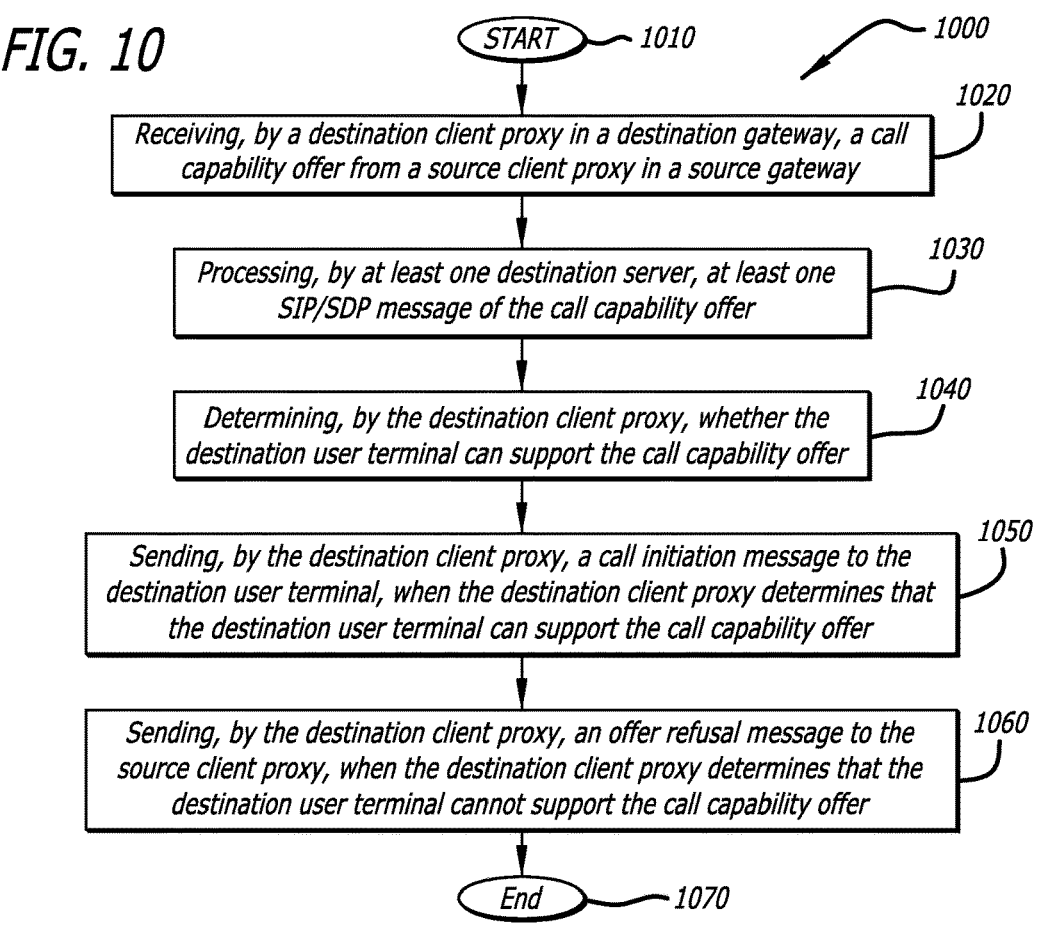

FIG. 10 is a flow chart depicting the disclosed method for reducing call setup delay in geomobile satellite networks for the destination side of the system depicted in FIG. 8, in accordance with at least one embodiment of the present disclosure.

DESCRIPTION

The methods and apparatus disclosed herein provide an operative system for reducing call setup delay in geomobile satellite networks.

As previously mentioned above, currently, establishing multimedia (e.g., voice and/or data) sessions (e.g., establishing a call connection) in a network typically employs session establishment protocols, such as Session Initiation Protocol/Session Description Protocol (SIP/SDP), that apply an offer/answer model to establish end-to-end state resource and management between a source user terminal (e.g., a satellite phone, a cellular phone, or a dual-mode phone) and a destination user terminal (e.g., a satellite phone, a cellular phone, or a dual-mode phone). In current practice, using SIP/SDP, for an error-free case, a minimum of seven (7) messages are typically exchanged across the end-to-end network between the source user terminal and the destination user terminal. For satellite networks, the exchange of the messages requires that each of these messages traverse the satellite air interface, which for the geomobile case introduces significant propagation delay. For double-hop geomobile networks (e.g., the message must traverse from a satellite source user link 120 to a satellite source feeder link 125 to a satellite destination feeder link 175 to a satellite destination user link 195 (refer to FIG. 1), or vise versa), an additional one (1) second of setup delay will be imposed for each message transmitted.

The disclosed system of the present disclosure decomposes the SIP/SDP client, which is typically resident in the user terminal (i.e. the source user terminal and the destination user terminal), into a terminal resident-client and a network-hosted client proxy, which allows for the number of messages required to traverse the high-delay, low-reliability satellite air interface to be reduced to a mandatory number of two (2) messages (i.e. offer and answer), with other SIP/SDP messages being supported as a configurable option. In this architecture, the network-hosted client proxy manages a session database that may be realized as a distributed database in order to accommodate architectures where gateway selection (as part of the terminal attachment procedure) may be driven by either the terminal or the network. In addition, the client proxy can be applied only to those session types that are typically performance-challenged, such as those using low bit rate and narrowband radio bearers.

Splitting the terminal client into two logical components: (1) a terminal-hosted client, and (2) a network-hosted client proxy, allows for the end-to-end protocol message exchange to be optimized to make the terrestrial standard protocols being adapted for use in a satellite network less "chatty". By employing a distributed database (note that this does not imply the use of a relational database), the architecture is able to support solutions where the gateway selection algorithm used at terminal attachment time may be either terminal-driven or network-driven. On the network side, the server functionality is realized using a load-balancing architecture intended to minimize the server load and the average protocol message service rate.

Further, the client proxy may provide an integrated Performance Enhancement Proxy (PEP) in order to further enhance protocol throughput and/or reliability and, in particular, to enhance Transmission Control Protocol (TCP) traffic. There are two different TCP PEP methodologies. One methodology is an integrated PEP (i.e. a Transport PEP), where a single PEP is integrated into the network client proxy. The other methodology is a distributed PEP (i.e. an Application PEP) where a Transport PEP works in tandem with a PEP integrated into the SIP client at the user terminal.

It should be noted that, in one or more embodiments, integrated vocoders (in the client proxy) are employed to support both vocoder-to-vocoder transcoding and vocoder switching for on-net sessions. In addition, International Telecommunication Union-Telecommunication Standardization Sector (ITU-T) standard vocoders (in the client proxy) are employed to support vocoder-to-vocoder transcoding and vocoder switching for off-net voice sessions.

In addition, it should be noted that the disclosed system has the capability to work in both the conventional current best practice type operational mode (where numerous messages are sent to establish a session) and in the delay-optimized operational mode (where less messages are being sent to establish a session) of the present disclosure. As such, the disclosed system has the ability to fall back to standards-based message flows for interworking with external standards-based networks (e.g., terrestrial or satellite) that do not incorporate the system and method of the present disclosure. The disclosed system has the capability to configure on a per logical interface granularity, the inclusion of optional messages over the air interface. The client proxy of the disclosed system is capable to adapt the negotiation message flow (between the source user terminal and the destination user terminal regarding their parameter capabilities) according to the capabilities of the network associated with the source user terminal and the capabilities of the network associated with the destination user terminal (i.e. according to whether the networks are conventional standards-based or whether the networks employ the disclosed system and method). In addition, the present disclosure allows for vocoder switching, which allows for already established calls to change vocoders dynamically in order to adapt to link conditions.

Also, in one or more embodiments, the present disclosure may be employed for point-to-multipoint applications (e.g., voice and video conferencing, Push-to-Talk groups) that involves subscribers connected to one, two, or more gateways (where at least one of which follows the disclosed system and method of the present disclosure).

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, data structures, or the like), which may carry out a variety of functions under the control of one or more software threads or processes executing on physical processor cores or in a virtualized environment or other processing devices. In addition, those skilled in the art will appreciate that embodiments of the present disclosure may be practiced in conjunction with other components, and that the system described herein is merely one example embodiment of the present disclosure.

For the sake of brevity, conventional techniques and components related to reducing call setup delay in geomobile satellite networks, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
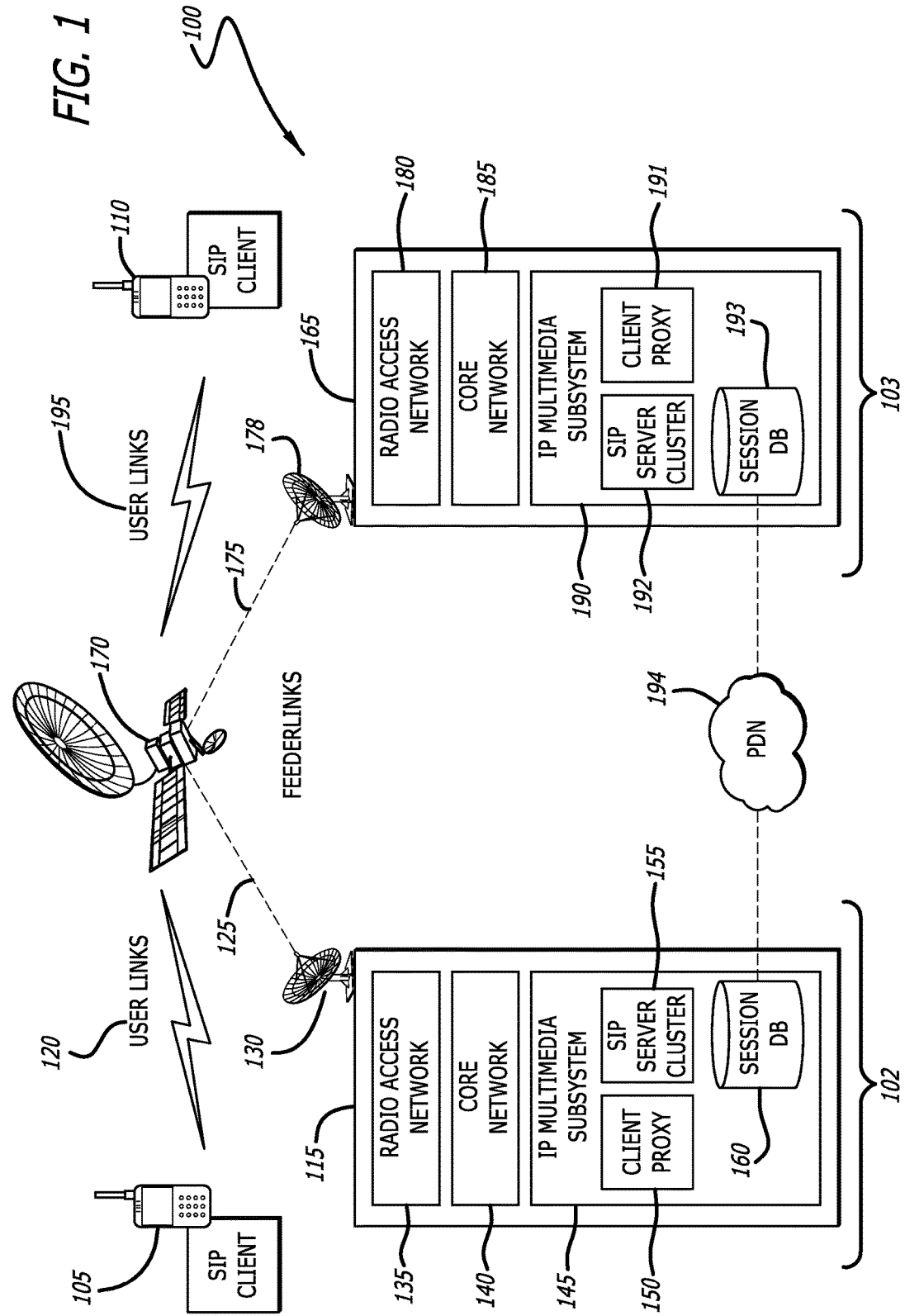

FIG. 1 is a diagram showing the disclosed system for reducing call setup delay in geomobile satellite networks, employing two gateways 115, 165, where both the source user terminal 105 and the destination user terminal 110 are satellite phones, and where the source side 102 and the destination side 103 are operated by the same entity (e.g., Iridium Satellite Phone Communications), in accordance with at least one embodiment of the present disclosure. As such, the operating entity will be operating the source user terminal 105, the source gateway 115, the satellite 170, the destination gateway 165, and the destination user terminal 110.

In this figure, a source user terminal (e.g., a SIP client) 105 desires to establish a call with a destination user terminal (e.g., a SIP client) 110. The source user terminal 105 sends a call request to a source gateway 115 via a satellite source user link 120 (from the source user terminal 105 to a satellite 170) and via a satellite source feeder link 125 (from the satellite 170 to the source gateway 115). The call request is a request by the source user terminal 105 to establish a call with the destination user terminal 110. The call request is received by a source satellite feederlink antenna 130 associated with the source gateway 115.

The source gateway 115 is shown to include a source radio access network 135, a source core network 140, and a source internet protocol (IP) multimedia subsystem (IMS) 145. The source radio access network 135 comprises radio frequency (RF) electronics connected to the source satellite feederlink antenna 130 for the transmission and receipt of messages. Some of the RF electronics may include a modem bank and a beam forming network (BFN). The source core network 140 may be essentially a standard cellular network used for processing cellular transmissions. The source IMS 145 comprises a source client proxy 150, a source server cluster (e.g., a SIP server cluster) 155, and a source session database 160.

After the source satellite feederlink antenna 130 receives air interface frames that carry a call request, the call request is passed through the source radio access network 135, for air interface frame processing, and then to the source core network 140. Then, the call request is passed from the source core network 140 to the source IMS 145. Once the call request is at the source IMS 145, the source server cluster 155 processes the SIP/SDP message(s) of the call request. In one or more embodiments, the source server cluster 155 comprises at least one source server. In some embodiments, when the source server cluster 155 comprises more than one source server, the source server cluster 155 employs a load-balancing architecture used to minimize the average server load and to minimize the average message service rate.

As part of the source server cluster 155 processing of the SIP/SDP messages of the call request, the processed call request is sent to the source client proxy 150, which in some embodiments, is integrated into the Session Border Controller (SBC) function. It should be noted that other types of session establishment protocols other than SIP/SDP may be employed by the disclosed system. The source client proxy 150 may comprise at least one processor and, in some embodiments, may provide a Performance Enhancement Proxy (PEP) to enhance throughput for Transmission Control Protocol (TCP) traffic.

The source client proxy 150 then reviews the processed call request, and determines a capability related to a parameter(s) of the source user terminal 105 and a capability related to a parameter(s) of the destination user terminal 110. In one or more embodiments, there may be various different types of parameters for the user terminals (e.g., for the source user terminal 105 and the destination user terminal 110) including, but not limited to, terminal type, data rate (e.g., bits per second (bps)) and vocoder types. The source client proxy 150 determines the capability related to a parameter(s) of the source user terminal 105 and the capability related to a parameter(s) of the destination user terminal 110 by accessing a source session database 160. In one or more embodiments, the source session database 160 is a distributed database implemented using a distributed data structure, such as a Distributed Hash Table or a distributed Counting Bloom Filter. The source session database 160 comprises data relating to the capabilities of the parameters for the user terminals (e.g., for the source user terminal 105 and the destination user terminal 110). In one or more embodiments, the source session database 160 resides within the source client proxy 150. In other embodiments, the source session database 160 resides outside and separate of the source client proxy 150, as is shown in FIG. 1.

After the source client proxy 150 determines the capabilities of the parameters for the source user terminal 105 and the destination user terminal 110, the source client proxy 150 compares the capabilities of the parameters for the source user terminal 105 with the capabilities of the parameters for the destination user terminal 110 to determine a call capability offer. The call capability offer is an offer of capabilities for the parameters to the destination user terminal 110 to be used for the established phone call or multimedia session. As such, the offered parameters to be used, must be able to be supported by the destination user terminal 110, as well as the source user terminal 105, for the call. For example, if the source client proxy 150 determines that both the source user terminal 105 and the destination user terminal 110 can support a specific data rate, the source client proxy 150 may choose to include that specific data rate in the call capability offer. For another example, if the source client proxy 150 determines that both the source user terminal 105 and the destination user terminal 110 can support a specific vocoder type (e.g., vocoder 1) or CODEC, the source client proxy 150 may choose to include that specific vocoder type (e.g., vocoder 1) or CODEC in the call capability offer. As another example, if the source client proxy 150 determines that the source user terminal 105 and the destination user terminal 110 cannot support a same specific vocoder type, but that a specific transcoder can be used by the source core network 140 to translate between one vocoder type (e.g., vocoder 1) that can be supported by the source user terminal 105 to the other vocoder type (e.g., vocoder 2) that can be supported by the destination user terminal 110, then the source client proxy 150 may choose to include the vocoder type (e.g., vocoder 2) that can be supported by the destination user terminal 110 in the call capability offer.

The source client proxy 150 then sends the call capability offer to a destination gateway 165, which is associated with the destination user terminal 110. The call capability offer is passed through the source server cluster 155, where it is processed into a SIP/SDP message(s), through the source core network 140, and through the source radio access network 135 to the source satellite feederlink antenna 130. The call capability offer is transmitted by the source satellite feederlink antenna 130 to the destination gateway 165 via a satellite source feeder link 125 (from the source gateway 115 to the satellite 170) and via a satellite destination feeder link 175 (from the satellite 170 to the destination gateway 165). The call capability offer is received by a destination satellite feederlink antenna 178 associated with the destination gateway 165.

The destination gateway 165 is shown to include a destination radio access network 180, a destination core network 185, and a destination IMS 190. The destination radio access network 180 comprises radio frequency (RF) electronics connected to the destination satellite feederlink antenna 178 for the transmission and receipt of messages. Some of the RF electronics of the radio access network 180 may include a modem bank and a BFN. The destination core network 185 may be essentially a standard cellular network used for processing cellular transmissions. The destination IMS 190 comprises a destination client proxy 191, a destination server cluster 192 (e.g., a SIP server cluster), and a destination session database 193.

After the destination satellite feederlink antenna 178 receives the call capability offer, the call capability offer is passed through the destination radio access network 180 to the destination core network 185. Then, the call capability offer is passed from the destination core network 185 to the destination IMS 190. Once the call capability offer is at the destination IMS 190, the destination server cluster 192 processes the SIP/SDP message(s) of the call capability offer. In one or more embodiments, the destination server cluster 192 comprises at least one destination server. In some embodiments, when the destination server cluster 192 comprises more than one destination server, the destination server cluster 192 employs a load-balancing architecture used to minimize the server load and to minimize the message service rate.

After the destination server cluster 192 processes the SIP/SDP messages of the call capability offer, the processed call capability offer is sent to the destination client proxy 191. As previously mentioned above, it should be noted that other types of session establishment protocols other than SIP/SDP may be employed by the disclosed system. The destination client proxy 191 may comprise at least one processor and, in some embodiments, may provide a Performance Enhancement Proxy (PEP) to enhance the performance of Transmission Control Protocol (TCP) traffic.

The destination client proxy 191 then reviews the processed call capability offer, and determines a whether the destination user terminal 110 can support the offered capabilities for the parameters in the call capability offer. The destination client proxy 191 does this by first determining the capabilities related to the parameters of the destination user terminal 110 by accessing a destination session database 193. In one or more embodiments, the destination session database 193 is a distributed database, not a relational database. The destination session database 193 comprises data relating to the capabilities of the parameters for the user terminals (e.g., for the source user terminal 105 and the destination user terminal 110). In one or more embodiments, the destination session database 193 resides within the destination client proxy 191. In other embodiments, the destination session database 193 resides outside and separate of the destination client proxy 191, as is shown in FIG. 1. In one or more embodiments, the destination session database 193 is synchronized with the source session database 160 over a network (e.g., a packet data network (PDN)) 194.

After the destination client proxy 191 determines the capabilities of the parameters for the destination user terminal 110, the destination client proxy 191 compares the capabilities of the parameters for the destination user terminal 110 with the capabilities of the parameters in the call capability offer to determine whether the destination user terminal 110 can support the capabilities of the parameters in the call capability offer. For example, the destination client proxy 191 will determine whether the destination user terminal 110 can support a specific data rate that is in the call capability offer. For another example, the destination client proxy 191 will determine whether the destination user terminal 110 can support a specific vocoder type (e.g., vocoder 1) that is in the call capability offer. As another example, if the destination client proxy 191 determines that the destination user terminal 110 cannot support the specific vocoder type (e.g., vocoder 1) that is in the call capability offer, the destination client proxy 191 will determine whether a specific transcoder can be used by the destination core network 185 to translate between the vocoder type (e.g., vocoder 1) that can be supported by the source user terminal 105 to the other vocoder type (e.g., vocoder 2) that can be supported by the destination user terminal 110.

If the destination client proxy 191 determines that the destination user terminal 110 can support the call capability offer, then the destination client proxy 191 sends a call initiation message to the destination user terminal 110. The call initiation message is passed through the destination server cluster 192, where it is processed into a SIP/SDP message(s), through the destination core network 185, and through the destination radio access network 180 to the destination satellite feederlink antenna 178. The call initiation message is transmitted by the destination satellite feederlink antenna 178 to the destination user terminal 110 via a satellite destination feeder link 175 (from the destination gateway 165 to the satellite 170) and via a satellite destination user link 195 (from the satellite 170 to the destination user terminal 110). The call initiation message is received by the destination user terminal 110, and then a call can be established between the source user terminal 105 and the destination user terminal 110.

However, if the destination client proxy 191 determines that the destination user terminal 110 cannot support the call capability offer (and there are no transcoding options that resolve the resource conflict), then the destination client proxy 191 sends a call refusal message to the source client proxy 150. The call refusal message is passed through the destination server cluster 192, where it is processed into a SIP/SDP message(s), through the destination core network 185, and through the destination radio access network 180 to the destination satellite feederlink antenna 178. The call refusal message is transmitted by the destination satellite feederlink antenna 178 to the source client proxy 150 via a satellite destination feeder link 175 (from the destination gateway 165 to the satellite 170) and via a satellite source feeder link 125 (from the satellite 170 to the source gateway 115). The call refusal message is received by the source satellite feederlink antenna 130.

After the source satellite feederlink antenna 130 receives the call refusal message, the call refusal message is passed through the source radio access network 135 to the source core network 140. Then, the call refusal message is passed from the source core network 140 to the source IMS 145. Once the call refusal message is at the source IMS 145, the source server cluster 155 processes the SIP/SDP message(s) of the call refusal message. After the source server cluster 155 processes the SIP/SDP messages of the call refusal message, the processed call refusal message is sent to the source client proxy 150. The source client proxy 150 then reviews the processed call refusal message.

In one or more embodiments, after the source client proxy 150 reviews the processed call refusal message, the source client proxy 150 forwards the call refusal message to the source user terminal 105 notifying the source user terminal 105 that a call cannot be established with the destination user terminal 110. For these embodiments, the call refusal message is passed through the source server cluster 155, where it is processed into a SIP/SDP message(s), through the source core network 140, and through the source radio access network 135 to the source satellite feederlink antenna 130. The call refusal message is transmitted by the source satellite feederlink antenna 130 to the source user terminal 105 via a satellite source feeder link 125 (from the source gateway 115 to the satellite 170) and via a satellite source user link 120 (from the satellite 170 to the source user terminal 105). The call refusal message is received by the source user terminal 105.

In other embodiments, after the source client proxy 150 reviews the processed call refusal message, the source client proxy 150 again compares the capabilities of the parameters for the source user terminal 105 with the capabilities of the parameters for the destination user terminal 110 to determine another call capability offer. The source client proxy 150 then sends the new call capability offer to the destination gateway 165, which is associated with the destination user terminal 110, and the process repeats as described above.

FIG. 2 is a diagram 200 depicting exemplary messages 210, 220, 230, 240, 250, 260, 270 that are sent and received when a source user terminal 105 is establishing a call with a destination user terminal 110, in accordance with at least one embodiment of the present disclosure. For the example message sequence shown in FIG. 2, the source user terminal 105 and the destination user terminal 110 are both satellite phones, as is shown in FIG. 1. However, it should be noted that if the source user terminal 105 is a cellular phone and the destination user terminal 110 is a satellite phone or if the source user terminal 105 is a satellite phone and the destination user terminal 110 is a cellular phone, the message sequence would include an Interconnection Border Control Function (IBCF) or Interworking Function (IWF) in the message processing chain.

In this figure, seven exemplary messages 210, 220, 230, 240, 250, 260, 270 are shown to be transmitted. Messages 210, 230, 270 are shown to be sent from a source user terminal (e.g., a SIP Client (Source-Side)) 273 on a source side 271 to a destination user terminal (e.g., a SIP Client (Destination-Side)) 274 on a destination side 272. And, messages 220, 240, 250, 260 are shown to be sent from the destination user terminal 274 to the source user terminal 273.

In this figure, the source client (e.g., a SIP Client (Source-Side)) 273 on the source side 271 comprises a source SIP client server (e.g., a SIP Client$_{SRC}$) 277 and a source client proxy server (e.g., a Client-Proxy$_{SRC}$) 278. It should be noted that, as is shown in FIG. 1, the source SIP client server (e.g., a SIP Client$_{SRC}$) 277 is hosted by the source user terminal 105, and the source client proxy server (e.g., a Client-Proxy$_{SRC}$) 278 is hosted by the network (e.g., the source gateway 115) (e.g., the source client proxy server (e.g., a Client-Proxy$_{SRC}$) 278 is integrated into the Session Border Controller (SBC) function). The source side 271 also comprises a source server (e.g., a SIP Server (Source-Side)) 275 that comprises a source proxy call setup control function (CSCF) server (e.g., a P-CSCF$_{SRC}$) 279 and a source CSCF server (e.g., a S-CSCF$_{SRC}$) 280.

The destination client (e.g., a SIP Client (Destination-Side)) 274 on the destination side 272 comprises a destination SIP client server (e.g., a SIP Client$_{DST}$) 284 and a destination client proxy server (e.g., a Client-Proxy$_{DST}$) 283. It should be noted that, as is shown in FIG. 1, the destination SIP client server (e.g., a SIP Client$_{DST}$) 284 is hosted by the destination user terminal 110, and the destination client proxy server (e.g., a Client-Proxy$_{DST}$) 283 is hosted by the network (e.g., the destination gateway 165) (e.g., the destination client proxy server (e.g., a Client-Proxy$_{DST}$) 283 is integrated into the Session Border Controller (SBC) function). The destination side 272 also comprises a destination server (e.g., a SIP Server (Destination-Side)) 276 that comprises a destination Proxy Call Session Control Function (P-CSCF) server (e.g., a P-CSCF$_{DST}$) 282, a destination Serving CSCF server (e.g., a S-CSCF$_{DST}$) 281, and an Interrogating CSCF (I-CSCF) (not shown).

During the process for establishing a call, the source user terminal 273 first sends a invitation message (e.g., SIP INVITE (SDP)) 210 to the destination user terminal 274. In response to the invitation message 210, the destination user terminal 274 sends a session progress message (e.g., SIP 183 (SDP)) 220 to the source user terminal 273. In response to the session progress message 220, the source user terminal 273 sends a progress acknowledgment message (e.g., SIP PRACK (SDP)) 230 to the destination user terminal 274. In response to the progress acknowledgment message 230, the destination user terminal 274 sends an OK response message (e.g., SIP 200—OK (SDP)) 240, a ringing message (e.g. SIP 180—RINGING) 250, and an OK to initiate call message (e.g., SIP—OK) 260 to the source user terminal 273. In response to the OK response message 240, the ringing message 250, and the OK to initiate call message 260; the source user terminal 273 sends an initiate acknowledgment message (e.g., SIP ACK) 270 to the destination user terminal 274. Then, a call between the source user terminal 273 and the destination user terminal 274 is established.

It should be noted that with the employment of the disclosed system, in order to establish a call, only the solid line portions of the messages 210, 220, 230, 240, 260 are required to be sent and the dotted line portions of the messages 220, 230, 240, 250, 270 are not required to be sent, thereby reducing the call setup delay in the network. As such, it should be noted that with the employment of the disclosed system, messages 250 and 270 can be completely eliminated. However, without the use of the disclosed system, in order to establish a call, all of the dotted line portions of the messages 220, 230, 240, 250, 270 and all of the solid line portions of the messages 210, 220, 230, 240, 260 are required to be sent, thereby making the call setup delay longer than with the employment of the disclosed system. In some embodiments, the dotted line portions of the messages 22, 230, 240, 250, 270 may be supported as a configurable option on a per-logical interface basis, in order to provide standards-based interworking with existing terrestrial cellular networks.

FIG. 3 shows an equation 300 for calculating the amount of call setup delay ($\delta_{SETUP}$) (i.e. propagation delay) for SIP-based services in a geomobile satellite network. The system and method of the present disclosure reduce the end-to-end call setup delay by addressing three basic parts of the propagation delay, which is expressed in equation 300. The first part ($\delta_{PROP}$) of equation 300 is addressed by employing a client proxy in the gateway to reduce the number of SIP messages (n) traversing the satellite link. The first part is also addressed by reducing the size of the SDP parameters (k), which are encapsulated in the SIP messages, by providing a terminal type-to-vocoder map (e.g., in the Session Database) and a set of transcoders in the IMS (e.g., in the Client Proxy) to allow for a call setup fastpath to be configured that eliminates the need for a lengthy and bandwidth-inefficient vocoder negotiation at the call setup time. Also, the first part is addressed by applying a standard internet protocol (IP) header compression, Robust Header Compression (RoHC) (for TCP and User Datagram Protocol (UDP)), and/or signaling compression (SIGCOMP) to the messages to reduce the overall size of the UDP/IP-encapsulated SIP messages.

The second part (($k_{nj}$−1) $\delta_{IFG}$) of equation 300, and in particular the interframe gap delay ($\delta_{IFG}$), is addressed by reducing the total number of SIP messages and average message size by using the tactics mentioned above for addressing the first part of the equation 300.

The third part ($\mu-\lambda)^{-1}$ (i.e. the interframe gap delay) of equation 300 is addressed by employing a virtualized SIP processing capability that the network can autonomously monitor for overload and dynamically rebalance the load (e.g., load balancing the SIP server cluster) when the central processing unit (CPU) or memory congestion is detected. In one or more embodiments, the preferred load balancing tactic would employ use of a "Worst Fit" bin-packing heuristic.

Figure 4:
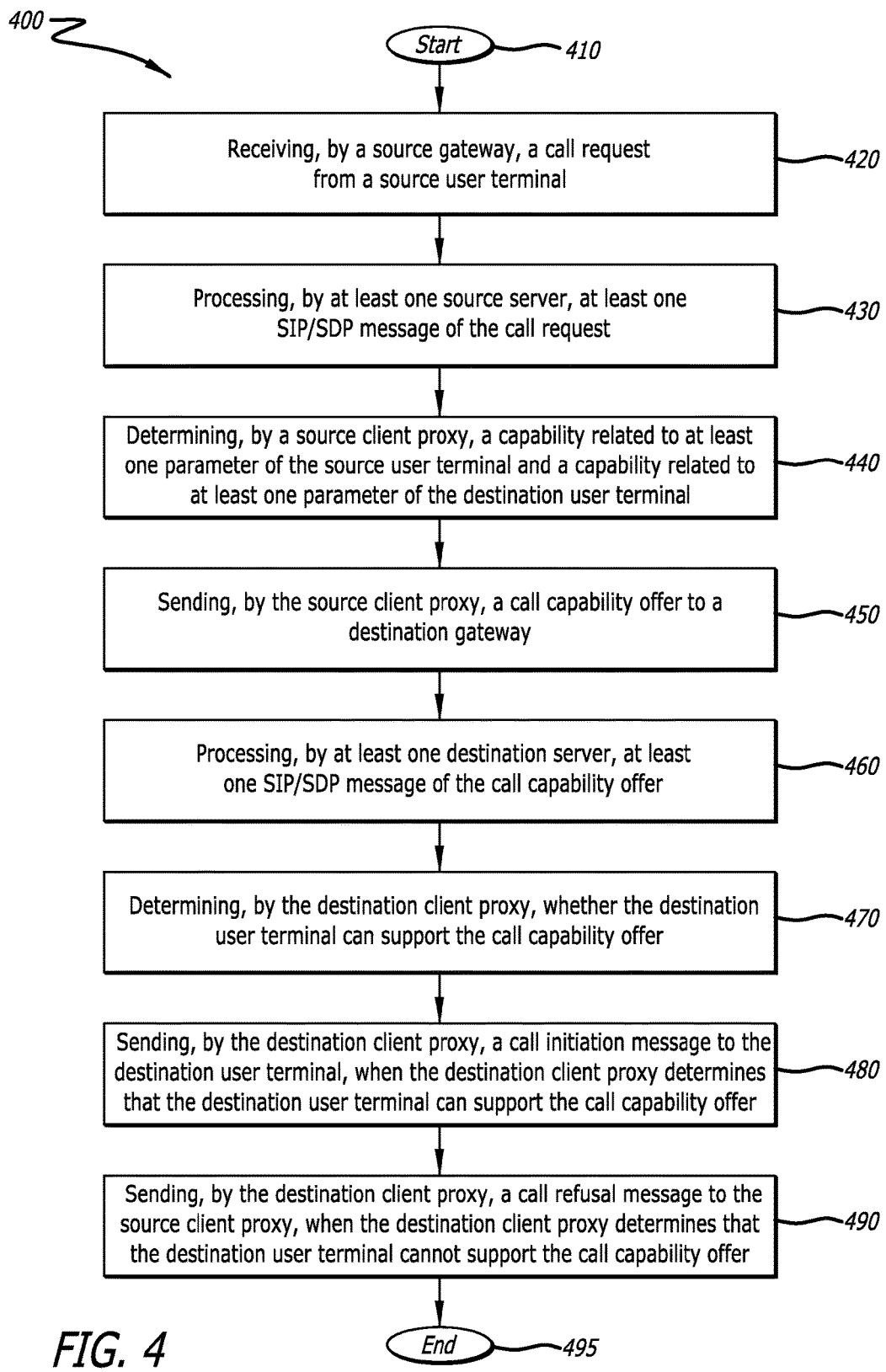
FIG. 4 is a flow chart depicting the disclosed method for reducing call setup delay in geomobile satellite networks for the systems depicted in FIGS. 1, 5, and 6, in accordance with at least one embodiment of the present disclosure.
Figure 5:
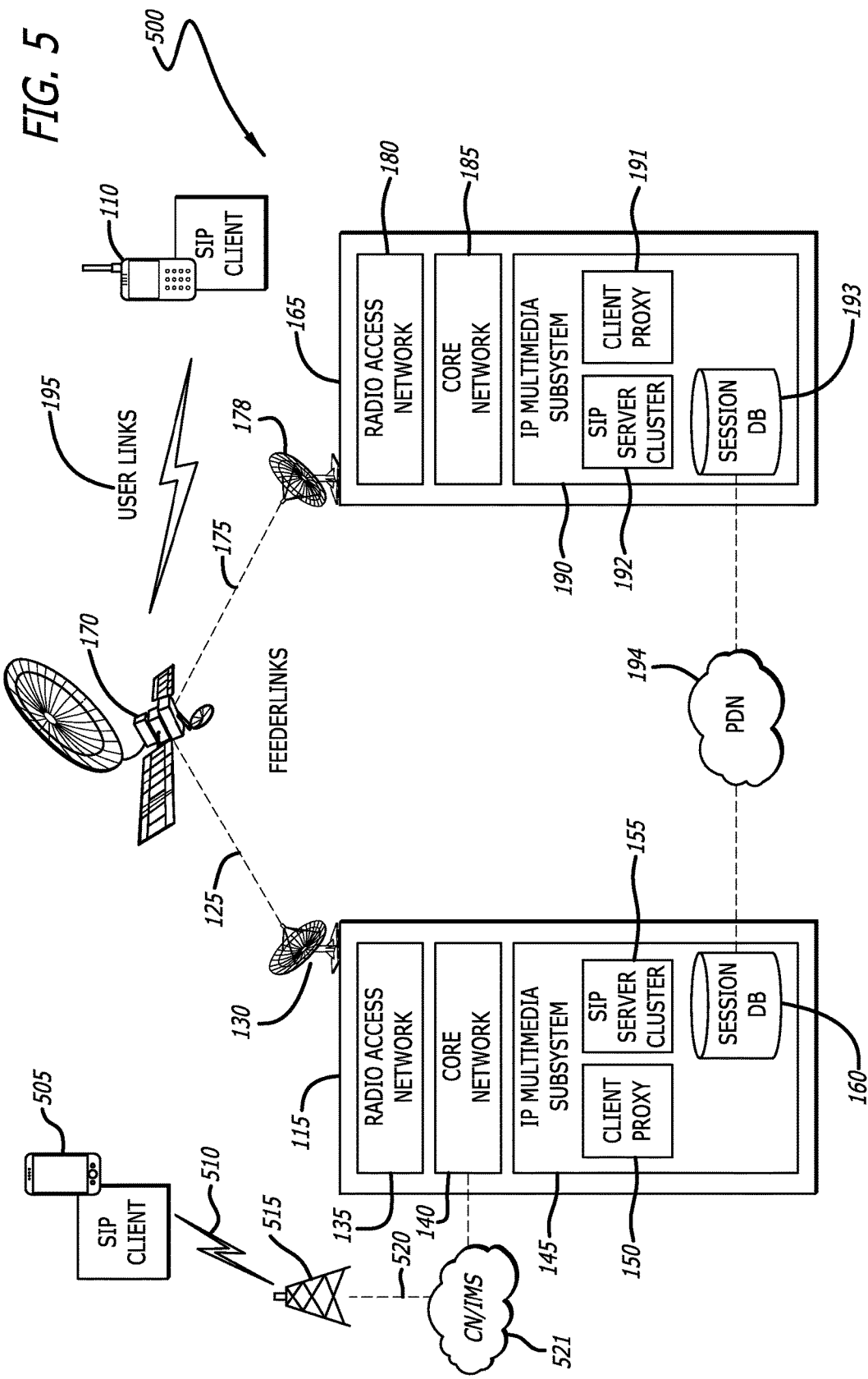
FIG. 5 is a diagram showing the disclosed system for reducing call setup delay in geomobile satellite networks, employing two gateways, where the source user terminal is a cellular phone and the destination user terminal is a satellite phone, in accordance with at least one embodiment of the present disclosure.
Figure 6:
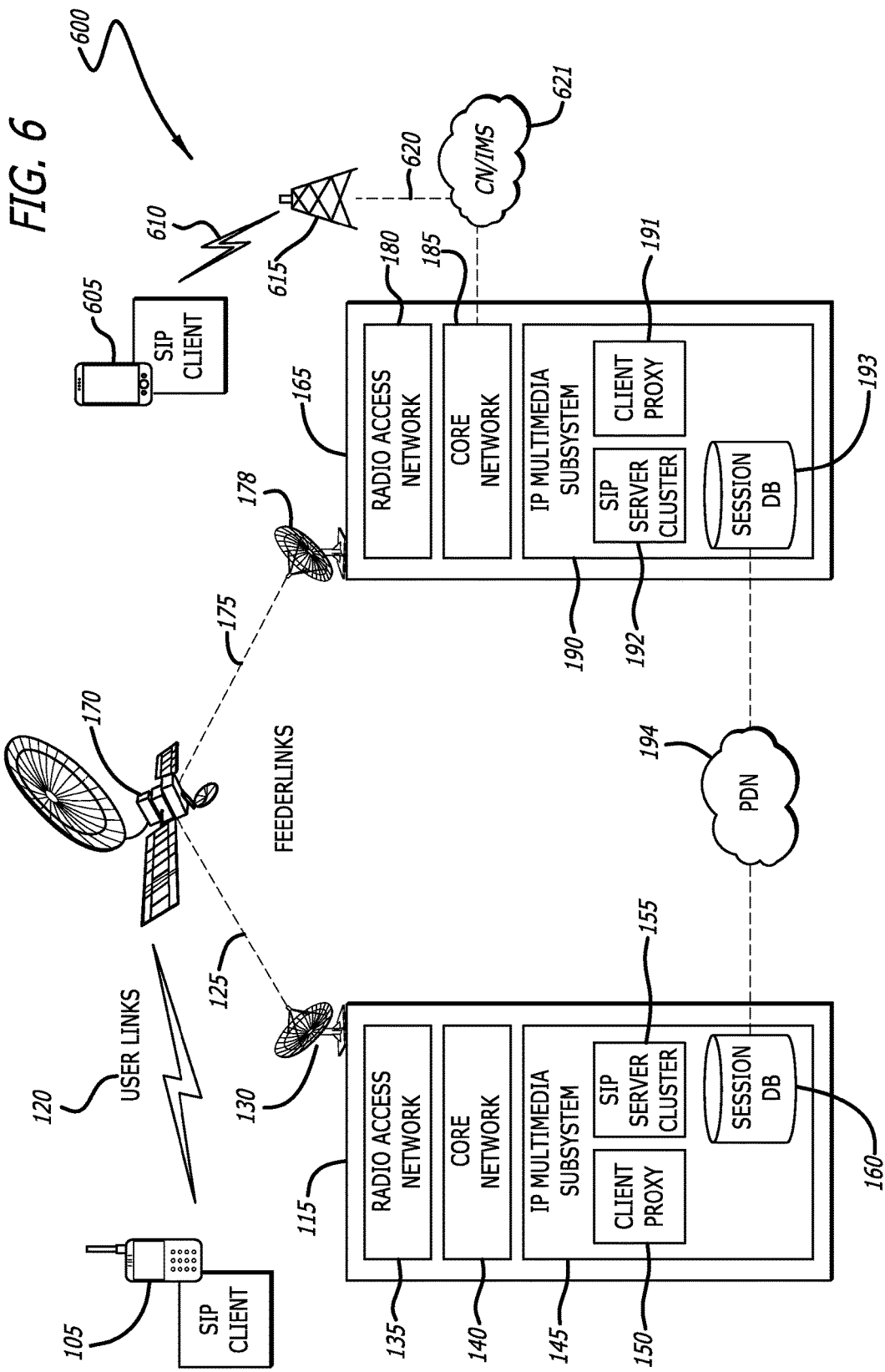
FIG. 6 is a diagram showing the disclosed system for reducing call setup delay in geomobile satellite networks, employing two gateways, where the source user terminal is a satellite phone and the destination user terminal is a cellular phone, in accordance with at least one embodiment of the present disclosure.

FIG. 4 is a flow chart depicting the disclosed method 400 for reducing call setup delay in geomobile satellite networks for the systems 100, 500, 600 depicted in FIGS. 1, 5, and 6, in accordance with at least one embodiment of the present disclosure. At the start 410 of the method 400, a source gateway receives a call request from a source user terminal 420. Then, at least one source server processes at least one SIP/SDP message of the call request 430. At least one source client proxy then determines a capability related to at least one parameter of the source user terminal and a capability related to at least one parameter of the destination user terminal 440.

Then, the source client proxy sends a call capability offer to a destination gateway 450. At least one destination server then processes at least one SIP/SDP message of the call capability offer 460. Then, the destination client proxy determines whether the destination user terminal can support the call capability offer 470.

When the destination client proxy determines that the destination user terminal can support the call capability offer, the destination client proxy then sends a call initiation message to the destination user terminal 480. When the destination client proxy determines that the destination user terminal cannot support the call capability offer, the destination client proxy then sends a call refusal message to the source client proxy 490. Then, the method 400 ends 495.

FIG. 5 is a diagram showing the disclosed system 500 for reducing call setup delay in geomobile satellite networks, employing two gateways 115, 165, where the source user terminal 505 is a cellular phone and the destination user terminal 110 is a satellite phone, in accordance with at least one embodiment of the present disclosure. It should be noted that the system 500 configuration and method of operation for the system 500 of FIG. 5 are the same as the system 100 configuration shown in FIG. 1 and the method of operation for the system 100 of FIG. 1 except that the source user terminal 505 in FIG. 5 is a cellular phone (not a satellite phone 105 as is shown in FIG. 1) that communicates with the source gateway 115 via at least one source cellular link 510, 520. It should also be noted that a cellular communications entity (e.g., Verizon Wireless) will be operating the source user terminal 505 and the cellular tower 515. And, a satellite phone communications entity (e.g., Iridium Satellite Phone Communications) will be operating the source gateway 115, the satellite 170, the destination gateway 165, and the destination user terminal 110.

In this figure, the source user terminal 505 is shown to be communicating with the source core network 140 of the source gateway 115 via a first source cellular link 510 (from the source user terminal 505 to a cellular tower 515) and via a second source cellular link 520 (from the cellular tower 515 to the source gateway 115). It should be noted that in some embodiments, the first source cellular link 510 is a wireless link and the second source cellular link 520 is a wired link. However, it should be noted that in other embodiments, different configurations of more or less cellular links 510, 520 and of more or less cellular towers 515 may be employed for the system 500. In this figure, the first source cellular link 520 is shown to be going through a core network/IP multimedia subsystem (CN/IMS) network 521.

It should be noted that in some embodiments, the source user terminal 505 is a dual-mode phone, instead of merely a cellular phone. A dual-mode phone is capable of simultaneously communicating with both terrestrial cellular networks and satellite-based networks. In some embodiments, the dual-mode phone source user terminal 505 sends the call request to the source gateway 115 via either: (a) the satellite source user link (e.g., 120 in FIG. 1) and a satellite source feeder link (e.g., 125 in FIG. 1), or (b) via at least one source cellular link 510, 520.

FIG. 6 is a diagram showing the disclosed system 600 for reducing call setup delay in geomobile satellite networks, employing two gateways 115, 165, where the source user terminal 105 is a satellite phone and the destination user terminal 605 is a cellular phone, in accordance with at least one embodiment of the present disclosure. It should be noted that the system 600 configuration and method of operation for the system 600 of FIG. 6 are the same as the system 100 configuration shown in FIG. 1 and the method of operation for the system 100 of FIG. 1 except that the destination user terminal 605 in FIG. 6 is a cellular phone (not a satellite phone 110 as is shown in FIG. 1) that communicates with the destination gateway 165 via at least one destination cellular link 610, 620. It should also be noted that a satellite phone communications entity (e.g., Iridium Satellite Phone Communications) will be operating the source user terminal 105, the source gateway 115, the satellite 170, and the destination gateway 165. And, a cellular communications entity (e.g., Verizon Wireless) will be operating the destination user terminal 605 and the cellular tower 615.

In this figure, the destination user terminal 605 is shown to be communicating with the destination core network 185 of the destination gateway 165 via a first destination cellular link 610 (from the destination user terminal 605 to a cellular tower 615) and via a second destination cellular link 620 (from the cellular tower 615 to the destination gateway 165). It should be noted that in some embodiments, the first destination cellular link 610 is a wireless link and the second destination cellular link 620 is a wired link. However, it should be noted that in other embodiments, different configurations of more or less cellular links 610, 620 and of more or less cellular towers 615 may be employed for the system 600. In this figure, the second destination cellular link 620 is shown to be going through a core network/IP multimedia subsystem (CN/IMS) network 621.

It should be noted that in some embodiments, the destination user terminal 605 is a dual-mode phone, instead of merely a cellular phone. In some embodiments, the destination user terminal dual-mode phone 605 receives the call initiation message from the destination gateway 165 via either: (a) a satellite destination feeder link (e.g., 175 in FIG. 1) and the satellite destination user link (e.g., 195 in FIG. 1), or (b) via at least one source cellular link 610, 620.

Figure 7:
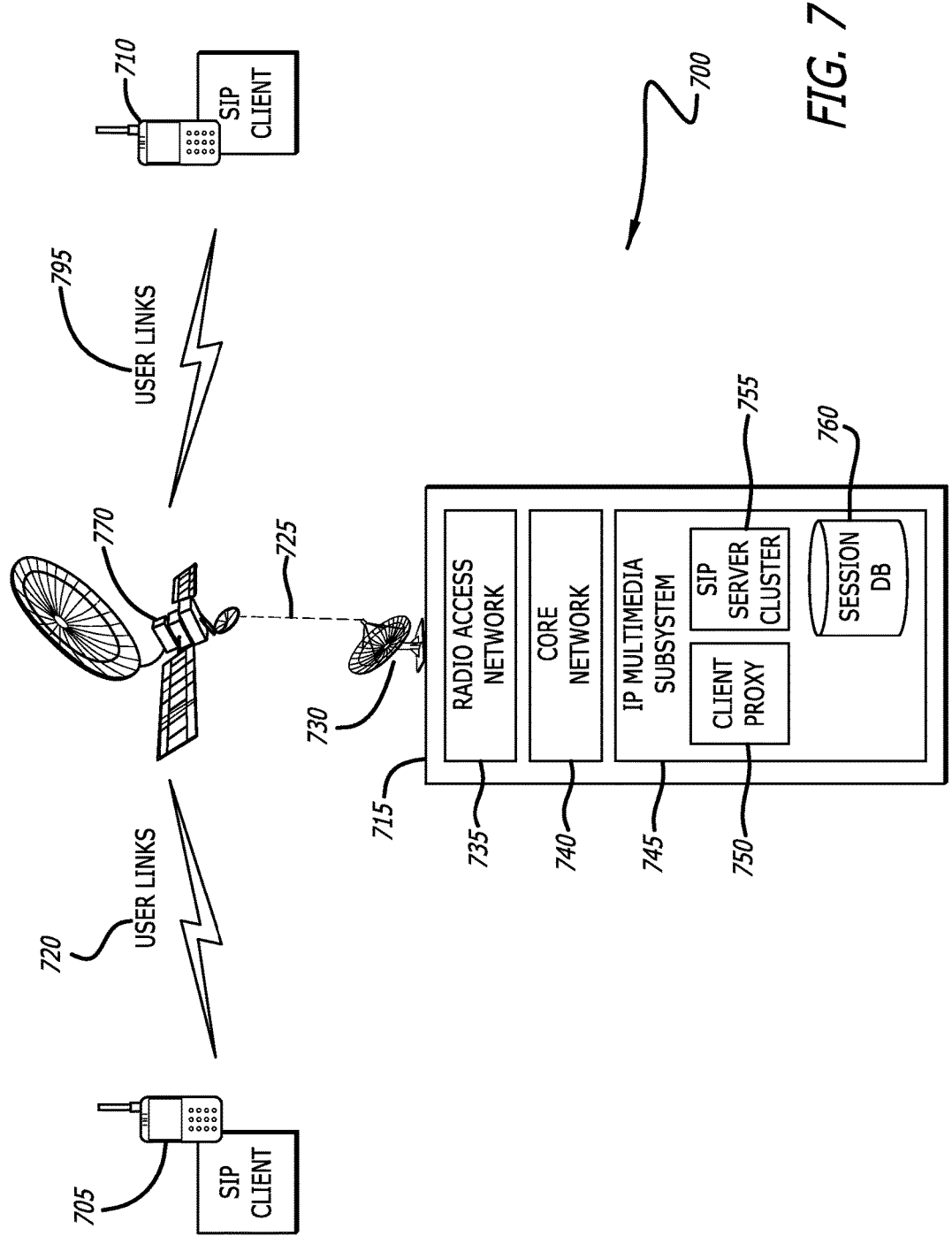
FIG. 7 is a diagram showing the disclosed system for reducing call setup delay in geomobile satellite networks, employing one gateway, where both the source user terminal and the destination user terminal are satellite phones, in accordance with at least one embodiment of the present disclosure.

FIG. 7 is a diagram showing the disclosed system 700 for reducing call setup delay in geomobile satellite networks, employing one gateway 715, where both the source user terminal 705 and the destination user terminal 710 are satellite phones, in accordance with at least one embodiment of the present disclosure. In this figure, a source user terminal (e.g., a SIP client) 705 desires to establish a call with a destination user terminal (e.g., a SIP client) 710. The source user terminal 705 sends a call request to a gateway 715 via a satellite source user link 720 (from the source user terminal 705 to a satellite 770) and via a satellite feeder link 725 (from the satellite 770 to the gateway 715). The call request is a request by the source user terminal 705 to establish a call with the destination user terminal 710. The call request is received by a satellite feederlink antenna 730 associated with the gateway 715.

The gateway 715 is shown to include a radio access network 735, a core network 740, and an internet protocol (IP) multimedia subsystem (IMS) 745. The radio access network 735 comprises radio frequency (RF) electronics connected to the satellite feederlink antenna 730 for the transmission and receipt of messages. Some of the RF electronics may include a modem bank and a beam forming network (BFN). The core network 740 may be essentially a standard cellular network used for processing cellular transmissions. The IMS 745 comprises a client proxy 750, a server cluster (e.g., a SIP server cluster) 755, and a session database 760.

After the satellite feederlink antenna 730 receives air interface frames that carry a call request, the call request is passed through the radio access network 735, for air interface frame processing, and then to the core network 740. Then, the call request is passed from the core network 740 to the IMS 745. Once the call request is at the IMS 745, the server cluster 755 processes the SIP/SDP message(s) of the call request. In one or more embodiments, the server cluster 755 comprises at least one server. In some embodiments, when the server cluster 755 comprises more than one server, the server cluster 755 employs a load-balancing architecture used to minimize the average server load and to minimize the average message service rate.

As part of the server cluster 755 processing of the SIP/SDP messages of the call request, the processed call request is sent to the client proxy 750, which in some embodiments, is integrated into the Session Border Controller (SBC) function. It should be noted that other types of session establishment protocols other than SIP/SDP may be employed by the disclosed system. The client proxy 750 may comprise at least one processor and, in some embodiments, may provide a Performance Enhancement Proxy (PEP) to enhance throughput for Transmission Control Protocol (TCP) traffic.

The client proxy 750 then reviews the processed call request, and determines a capability related to a parameter(s) of the source user terminal 705 and a capability related to a parameter(s) of the destination user terminal 710. In one or more embodiments, there may be various different types of parameters for the user terminals (e.g., for the source user terminal 705 and the destination user terminal 710) including, but not limited to, terminal type, data rate (e.g., bits per second (bps)) and vocoder types. The client proxy 750 determines the capability related to a parameter(s) of the source user terminal 705 and the capability related to a parameter(s) of the destination user terminal 710 by accessing a session database 760. In one or more embodiments, the session database 760 is a distributed database implemented using a distributed data structure, such as a Distributed Hash Table or a distributed Counting Bloom Filter. The session database 760 comprises data relating to the capabilities of the parameters for the user terminals (e.g., for the source user terminal 705 and the destination user terminal 710). In one or more embodiments, the session database 760 resides within the client proxy 750. In other embodiments, the session database 760 resides outside and separate of the client proxy 750, as is shown in FIG. 7.

After the client proxy 750 determines the capabilities of the parameters for the source user terminal 705 and the destination user terminal 710, the client proxy 750 compares the capabilities of the parameters for the source user terminal 705 with the capabilities of the parameters for the destination user terminal 710 to determine a call capability offer. The call capability offer is an offer of capabilities for the parameters to the destination user terminal 710 to be used for the established phone call or multimedia session. As such, the offered parameters to be used, must be able to be supported by the destination user terminal 710, as well as the source user terminal 705, for the call.

The client proxy 750 then determines a whether the destination user terminal 710 can support the offered capabilities for the parameters in the call capability offer. If the client proxy 750 determines that the destination user terminal 710 can support the call capability offer, then the client proxy 750 sends a call initiation message to the destination user terminal 710. The call initiation message is passed through the server cluster 755, where it is processed into a SIP/SDP message(s), through the core network 740, and through the radio access network 735 to the satellite feederlink antenna 730. The call initiation message is transmitted by the satellite feederlink antenna 730 to the destination user terminal 710 via a satellite feeder link 725 (from the gateway 715 to the satellite 770) and via a satellite destination link 795 (from the satellite 770 to the destination user terminal 710). The call initiation message is received by the destination user terminal 710, and then a call can be established between the source user terminal 705 and the destination user terminal 710.

However, if the client proxy 750 determines that the destination user terminal 110 cannot support the call capability offer (and there are no transcoding options that resolve the resource conflict), then the client proxy 750 sends a call refusal message to the source user terminal 705 notifying the source user terminal 705 that a call cannot be established with the destination user terminal 710. The call refusal message is passed through the server cluster 755, where it is processed into a SIP/SDP message(s), through the core network 740, and through the radio access network 735 to the satellite feederlink antenna 730. The call refusal message is transmitted by the satellite feederlink antenna 730 to the source user terminal 705 via a satellite feeder link 725 (from the gateway 715 to the satellite 770) and via a satellite source user link 720 (from the satellite 770 to the source user terminal 705). The call refusal message is received by the source user terminal 105. It should be noted that in some embodiments, the source user terminal 705 and/or the destination user terminal 710 is a cellular phone or a dual-mode phone, instead of a satellite phone, as is shown in FIG. 7.

FIG. 8 is a diagram showing the disclosed system for reducing call setup delay in geomobile satellite networks, employing two gateways 815, 865, where both the source user terminal 805 and the destination user terminal 810 are satellite phones, and where the source side 802 is operated by one entity (e.g., Commercial Satellite Service Provider A) and the destination side 803 is operated by another entity (e.g., Commercial Satellite Service Provider B), in accordance with at least one embodiment of the present disclosure. As such, a first operating entity will be operating the source user terminal 105, the source gateway 115, and the source satellite 870. And, a second operating entity will be operating the destination user terminal 110, the destination gateway 165, and the destination satellite 871.

It should be noted that the system 800 configuration and method of operation for the system 800 of FIG. 8 are the same as the system 100 configuration shown in FIG. 1 and the method of operation for the system 100 of FIG. 1 except that two satellites 870, 871, which are operated by different entities, are used for communications as opposed to only one satellite 170, as is shown in FIG. 1. As such, the source user terminal 105 communicates with the source gateway 115 via a satellite source user link 820 (from the source user terminal 105 to the source satellite 870) and via a satellite source feeder link 825 (from the source satellite 870 to the source gateway 115). Also, the destination user terminal 110 communicates with the destination gateway 165 via a satellite destination user link 895 (from the destination user terminal 110 to the destination satellite 871) and via a satellite destination feeder link 875 (from the destination satellite 871 to the destination gateway 165).

In addition, the source gateway 115 communicates with the destination gateway 165 via a satellite source feeder link 825 (from the source gateway 115 to the source satellite 870), via a satellite crosslink 872 (from the source satellite 870 to the destination satellite 871), and via a satellite destination feeder link 875 (via the destination satellite 871 to the destination gateway 165). It should be noted that in some embodiments, the source gateway 115 communicates with the destination gateway 165 via a source Interworking Function (IWF) 856, which may be located in the source IMS 145, to a destination IWF 893, which may be located in the destination IMS 190, over a network (e.g., PDN) 194.

FIG. 9 is a flow chart depicting the disclosed method 900 for reducing call setup delay in geomobile satellite networks for the source side 802 of the system 800 depicted in FIG. 8, in accordance with at least one embodiment of the present disclosure. At the start 910 of the method 900, a source gateway receives a call request from a source user terminal 920. Then, at least one source server processes at least one SIP/SDP message of the call request 930. At least one source client proxy then determines a capability related to at least one parameter of the source user terminal and a capability related to at least one parameter of the destination user terminal 940. Then, the source client proxy sends a call capability offer to a destination gateway 950. Then, the method 900 ends 960.

FIG. 10 is a flow chart depicting the disclosed method 1000 for reducing call setup delay in geomobile satellite networks for the destination side 803 of the system 800 depicted in FIG. 8, in accordance with at least one embodiment of the present disclosure. At the start 1010 of the method 1000, a destination client proxy in a destination gateway receives a call capability offer from a source client proxy in a source gateway 1020. At least one destination server then processes at least one SIP/SDP message of the call capability offer 1030. Then, the destination client proxy determines whether the destination user terminal can support the call capability offer 1040.

When the destination client proxy determines that the destination user terminal can support the call capability offer, the destination client proxy then sends a call initiation message to the destination user terminal 1050. When the destination client proxy determines that the destination user terminal cannot support the call capability offer, the destination client proxy then sends a call refusal message to the source client proxy 1060. Then, the method 1000 ends 1070.

Although particular embodiments have been shown and described, it should be understood that the above discussion is not intended to limit the scope of these embodiments. While embodiments and variations of the many aspects of the present disclosure have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for reducing call setup delay in a satellite network, the method comprising:
  receiving, by a source satellite gateway, a call request from a source user terminal comprising a source session initiation protocol (SIP) client, wherein the source satellite gateway is separate from the source user terminal and comprises a source client proxy and a source session database,
  wherein the call request is a request to establish a call with a destination user terminal;
  determining, by the source client proxy, a capability related to at least one parameter of the source user terminal and a capability related to at least one parameter of the destination user terminal;
  sending, by the source client proxy, a call capability offer via a satellite to a destination satellite gateway, wherein the destination satellite gateway is separate from the destination user terminal and comprises a destination client proxy and a destination session database,
  wherein the call capability offer is based on the capability related to the at least one parameter of the source user terminal and the capability related to the at least one parameter of the destination user terminal;
  determining, by the destination client proxy, whether the destination user terminal can support the call capability offer;
  sending, by the destination client proxy, a call initiation message to the destination user terminal comprising a destination SIP client, when the destination client proxy determines that the destination user terminal can support the call capability offer; and
  sending, by the destination client proxy, a call refusal message via the satellite to the source client proxy, when the destination client proxy determines that the destination user terminal cannot support the call capability offer.

2. The method of claim 1, wherein the method further comprises:
  processing, by at least one source server, tai least one SIP/SDP message of the call request,
  wherein the source satellite gateway comprises the at least one source server.

3. The method of claim 2, wherein the source satellite gateway comprises a source server cluster comprising the at least one source server.

4. The method of claim 1, wherein the method further comprise:
  processing, at least one destination server, at least one SIP/SDP message of the call capability offer,
  wherein the destination satellite gateway comprises the at least one destination server.

5. The method of claim 4, wherein the destination satellite gateway comprises at least one destination server cluster comprising the at least one destination servers.

6. The method of claim 1, wherein the source user terminal is a satellite phone.

7. The method of claim 6, wherein the source user terminal sends the call request to the source satellite gateway via a satellite source user link and a satellite source feeder link.

8. The method of claim 1, wherein the source user terminal is a cellular phone.

9. The method of claim 8, wherein the source satellite gateway receives the call request from the source terminal via at least one source cellular link.

10. The method of claim 1, wherein the destination uses terminal is a satellite phone.

11. The method of claim 10, wherein the destination client proxy sends the call initiation message to the destination user terminal via a satellite destination feeder link and a satellite destination user link.

12. The method of claim 10, wherein the destination client proxy sends the call refusal message to the source client proxy via a satellite destination feeder link and a satellite source feeder link.

13. The method of claim 1, wherein the destination user terminal is a cellular phone.

14. The method of claim 13, wherein the destination client proxy sends the call initiation message to the destination user terminal via at least one destination cellular link.

15. The method of claim 13, wherein the destination client proxy sends the call refusal message to the source client proxy via a satellite destination feeder link and a satellite source feeder link.

16. The method of claim 1, wherein the source client proxy determines the capability related to the at least one parameter of the source user terminal and the capability related to the at least one parameter of the destination user terminal by accessing a source session database.

17. The method of claim 1, wherein the destination client proxy determines whether the destination user terminal can support the call capability offer by accessing a destination session database.

18. The method of claim 1, wherein the method further comprises:
  synchronizing, over a network, the source session database, which is within the source satellite gateway, and the destination session database, which is within the destination satellite gateway.

19. The method of claim 18, wherein the network is a packet data network (PDN).

20. The method of claim 1, wherein the source client proxy provides a performance enhancement proxy (PEP) to enhance transmission control protocol (TCP) traffic.

21. The method of claim 1, wherein the destination client proxy provides a performance enhancement proxy (PEP) to enhance transmission control protocol (TCP) traffic.

22. A system for reducing call setup delay in a satellite network, the system comprising:
- a source user terminal comprising a source session initiation protocol (SIP) client to send a call request to a source satellite gateway, wherein the source satellite gateway is separate from the source user terminal and comprises a source client proxy and a source session database,
- wherein the call request is a request to establish a call with a destination user terminal;
- the source client proxy, to determine a capability related to at least one parameter of the source user terminal and a capability related to at least one parameter of the destination user terminal, and to send a call capability offer via a satellite to a destination satellite gateway, wherein the destination satellite gateway is separate from the destination user terminal and comprises a destination client proxy and a destination session database,
- wherein the call capability offer is based on the capability related to the at least one parameter of the source user terminal and the capability related to the at least one parameter of the destination user terminal; and
- a destination client proxy to determine whether the destination user terminal can support the call capability offer, to send a call initiation message to the destination user terminal comprising a destination SIP client when the destination client proxy determines that the destination user terminal can support the call capability offer, and to send a call refusal message via the satellite to the source client proxy when the destination client proxy determines that the destination user terminal cannot support the call capability offer.

23. A method for reducing call setup delay in a satellite network, the method comprising:
- sending, by a source user terminal comprising a source session initiation protocol (SIP) client, a call request via a satellite to a satellite gateway, wherein the satellite gateway is separate from the source user terminal and a destination user terminal, and the satellite gateway comprises a client proxy and a session database,
- wherein the call request is a request to establish a call with the destination user terminal;
- determining, by than client proxy, a capability related to at least one parameter of the source user terminal and a capability related to at least one parameter of the destination user terminal;
- generating, by the client proxy, a call capability offer, wherein the capability offer is based on the capability related to the at least one parameter of the source user terminal and the capability related to the at least one parameter of the destination user terminal;
- determining, by the client proxy, whether the destination user terminal can support the call capability offer;
- sending, by the client proxy, a call initiation message via the satellite to the destination user terminal comprising a destination SIP client, when the client proxy determines that the destination user terminal can support the call capability offer; and
- sending, by the client proxy, a call refusal message via the satellite to the source user terminal, when the client proxy determines that the destination user terminal cannot support the call capability offer.

24. A system for reducing call setup delay in a satellite network, the system comprising:
- a source user terminal comprising a source session initiation protocol (SIP) client to send a call request via a satellite to a satellite gateway, wherein the satellite gateway is separate from the source user terminal and a destination user terminal, and wherein the satellite gateway comprises a session database,
- wherein the call request is a request to establish a call with the destination user terminal comprising a destination SIP client; and
- a client proxy, in the satellite gateway, to send at least one message via the satellite to negotiate at least one capability related to at least one parameter of the source user terminal and of the destination user terminal to establish the call between the source user terminal and the destination user terminal.

25. The system of claim 24, wherein the client proxy is further capable to adapt a negotiation message flow according to capabilities of a network associated with the source user terminal and capabilities of a network associated with the destination user terminal.

26. The system of claim 24, wherein the client proxy is further capable to switch vocoders, thereby allowing for already established calls to change the vocoders dynamically in order to adapt to link conditions.

27. A method for reducing call setup delay in a satellite network, the method comprising:
- receiving, by a source satellite gateway, a call request from a source user terminal comprising a source session initiation protocol (SIP) client, wherein the source satellite gateway is separate from the source user terminal, and wherein the source satellite gateway comprises a source session database,
- wherein the call request is a request to establish a call with a destination user terminal comprising a destination SIP client;
- determining, by a source client proxy in the source satellite gateway, a capability related to at least one parameter of thee source user terminal and a capability related to at least one parameter of the destination user terminal;
- sending, by the source client proxy, a call capability offer via a satellite to a destination satellite gateway, wherein the destination satellite gateway is separate from the destination user terminal and comprises a destination client proxy, and wherein the destination satellite gateway comprises a destination session database,
- wherein the call capability offer is based on the capability related to the at least one parameter of the source user terminal and the capability related to the at least one parameter of the destination user terminal.

28. A method for reducing call setup delay in a satellite network, the method comprising:
- receiving, by a destination client proxy in a destination satellite gateway, a call capability offer via a satellite from source client proxy in a source satellite gateway,
- wherein the source satellite gateway comprises a source session database, and the destination satellite gateway comprises a destination session database,
- wherein the destination satellite gateway is separate from a destination user terminal comprising a destination session initiation protocol (SIP) client, and the source satellite gateway is separate from a source user terminal comprising a source SIP client,
- wherein the call capability offer is based on a capability related to at least one parameter of the source user terminal, which is requesting a call with the destination user terminal, and a capability related to at least one parameter of the destination user terminal;

determining, by the destination client proxy, whether the destination user terminal can support the call capability offer;

sending, by the destination client proxy, a call initiation message to the destination user terminal, when the destination client proxy determines that the destination user terminal can support the call capability offer; and sending, by the destination client proxy, a call refusal message via a satellite to the source client proxy, when the destination client proxy determines that the destination user terminal cannot support the call capability offer.

\* \* \* \* \*

UNITED STATES PATENT AND TRADEMARK OFFICE
CERTIFICATE OF CORRECTION

PATENT NO.         : 10,069,558 B2
APPLICATION NO.    : 14/749401
DATED              : September 4, 2018
INVENTOR(S)        : James P. Scott Page 1 of 1

It is certified that error appears in the above-identified patent and that said Letters Patent is hereby corrected as shown below:

In the Claims

In Claim 2, Column 19, Line 66, change "tai" to --at--.

In Claim 4, Column 20, Line 7, change "comprise" to --comprises--.

In Claim 4, Column 20, Line 8, change "processing, at least" to --processing, by at least--.

In Claim 5, Column 20, Line 14, change "servers" to --server--.

In Claim 9, Column 20, Line 24, change "source terminal" to --source user terminal--.

In Claim 10, Column 20, Line 26, change "uses" to --user--.

In Claim 23, Column 21, Line 44, change "by than client proxy" to --by the client proxy--.

In Claim 23, Column 21, Line 49, change "the capability" to --the call capability--.

In Claim 27, Column 22, Line 37, change "thee source" to --the source--.

In Claim 28, Column 22, Line 54, change "from source" to --from a source--.

Signed and Sealed this
Sixth Day of November, 2018

Andrei Iancu
*Director of the United States Patent and Trademark Office*